United States Patent [19]
Fruth et al.

[11] 3,779,266
[45] Dec. 18, 1973

[54] DEVICE FOR AUTOMATICALLY SWITCHING A FEED FLOW FROM ONE TO THE OTHER OF TWO PARALLEL BRANCH LINES OF AN EMERGENCY COOLING SYSTEM, ESPECIALLY IN NUCLEAR REACTORS

[75] Inventors: Hans Fruth, Erlangen-Bruck; Wolfgang Godel, Munich, both of Germany

[73] Assignee: Siemens Aktiengesellschaft, Berlin and Munich, Germany

[22] Filed: Dec. 22, 1971

[21] Appl. No.: 210,780

[30] Foreign Application Priority Data
Dec. 24, 1970  Germany.................. P 20 63 674.2

[52] U.S. Cl. ................................. 137/110, 137/119
[51] Int. Cl. .......................................... G05d 11/00
[58] Field of Search.................... 137/110, 117, 118, 137/119

[56] References Cited
UNITED STATES PATENTS
2,724,967  11/1955  Gehre............................. 137/110 X
3,470,896  10/1969  Au Werter........................ 137/110
FOREIGN PATENTS OR APPLICATIONS
526,869  6/1931  Germany........................ 137/118

Primary Examiner—Martin P. Schwadron
Assistant Examiner—David J. Zobkiw
Attorney—Arthur E. Wilfond et al.

[57] ABSTRACT

Device for automatically switching a feed flow from one to the other of two parallel lines branching from a feed line when a break occurs in one of the branch lines, includes a piston-controlled three-way valve situated at a location of the feed line at which the branch lines branch off, the three-way valve having an inlet connected to the feed line and a respective outlet connected to each of the branch lines, the three-way valve having a valve member normally closing one of the outlets and being operatively connected to a displaceable piston and actuable thereby for opening the normally closed outlet and closing the other of the outlets, a fixed throttle disposed in each of the outlets, a first pressure line connected between one side of the piston and the branch line connected to the normally closed outlet at a location thereof downstream of the fixed throttle in the normally closed outlet, and a second pressure line connected between the other side of the piston and the branch line connected to the other outlet at a location thereof downstream of the fixed throttle in the other outlet.

6 Claims, 4 Drawing Figures

DEVICE FOR AUTOMATICALLY SWITCHING A FEED FLOW FROM ONE TO THE OTHER OF TWO PARALLEL BRANCH LINES OF AN EMERGENCY COOLING SYSTEM, ESPECIALLY IN NUCLEAR REACTORS

The invention relates to device for automatically switching a feed flow from one to the other of two parallel branch lines of an emergency cooling system, especially in nuclear reactors.

In nuclear reactors, in the event of a major accident, such as, for instance, rupture of the main coolant line, assurance must be provided that the post-decay heat generated in the reactor core is safely removed. This means that the required auxiliary circulatory loop which is responsible for the emergency feeding and after-cooling, must remain operative with virtually absolute reliability even when damage may have possibly occurred within the auxiliary system.

When a break occurs in the main coolant line of a pressurized-water reactor, the pressure in the entire primary system drops from the operating pressure to the equalizing pressure in the reactor building, due to the escaping coolant, at a velocity which varies in accordance with the cross section of the break or rupture. The result thereof is that when the reactor pressure is relatively low, a "low pressure feed" is effected by the after-cooling pumps; if, however, the pressure remains at a relatively higher level for an extended period of time, then only an average or minor accident involving loss of coolant has occurred, and high-pressure feed is instituted with the high-pressure safety feed pumps.

This high-pressure feed system is generally formed of three or four completely separated partial systems having one pump each. In order to increase the reliability of the partial systems, the feed from each partial system may be carried out through two branch lines, so that when a rupture of one branch line should occur, reliable feeding through the other branch line is possible nevertheless, because the rupture of a feed line proper can also have caused the coolant loss accident.

The determination of the faulty branch line to the sound branch line at all times is of special importance.

It is accordingly an object of the invention to provide device for automatically switching a feed flow from one to the other of two parallel lines branching from a feed line when a break occurs in one of the branch lines, which operates reliably without external power and a costly measuring system.

With the foregoing and other objects in view, there is provided, in accordance with the invention, device for automatically switching a feed flow from one to the other of two parallel lines branching from a feed line when a break occurs in one of the branch lines, comprising a piston-controlled three-way valve situated at a location of the feed line at which the branch lines branch off, the three-way valve having an inlet connected to the feed line and a respective outlet connected to each of the branch lines, the three-way valve having a valve member normally closing one of the outlets and being operatively connected to a displaceable piston and actuable thereby for opening the normally closed outlet and closing the other of the outlets, a fixed throttle disposed in each of the outlets, a first pressure line connected between one side of the piston and the branch line connected to the normally closed outlet at a location thereof downstream of the fixed throttle in the normally closed outlet, and a second pressure line connected between the other side of the piston and the branch line connected to the other outlet at a location thereof downstream of the fixed throttle in the other outlet.

In accordance with a further feature of the invention, the piston is displaceable substantially in vertical direction, the one side of the piston being the lower side thereof, and the other side of the piston being the upper side thereof.

In accordance with another feature of the invention, a pressure-equalizing line connects the spaces located above and below the valve member of the three-way valve.

Due to the foregoing construction of the device of the invention, assurance is provided that when rupture of one branch line and the resultant pressure drop occur, automatic switching of the feed from the ruptured branch line to the sound branch line is effected.

In order to increase the reliability of the feed system, in accordance with an added feature of the invention, two piston-controlled three-way valves are connected in tandem in the feed flow direction so that the inlet of the farther downstream valve is connected to one of the outlets of the farther upstream valve and that, when the normally closed outlets of the valves are in fact closed, the flow path of the feed passes through both valves in series, into the one branch line and that the two other outlets, respectively, of the valves are connected in parallel with the second branch.

The latter construction assures that, even if failure of one of the three-way valves should occur, reliable switching of the feed flow can be accomplished by the other three-way valve.

In order to eliminate the possibility that coolant can still be fed into the faulty branch line, when only partial opening or closing of the second valve is effected, there is provided, further in accordance with the invention, a check valve located upstream of the fixed throttle of the second outlet of the farther downstream valve. Furthermore, in accordance with the invention, the pressure lines for the upper and lower sides of the actuator pistons of the respective valves are connected in parallel, when the three-way valves are connected in tandem.

Other features which are considered as characteristic for the invention are set forth in the appended claims.

Although the invention is illustrated and described herein as embodied in device for automatically switching a feed flow from one to the other of two parallel branch lines of an emergency cooling system, especially in nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
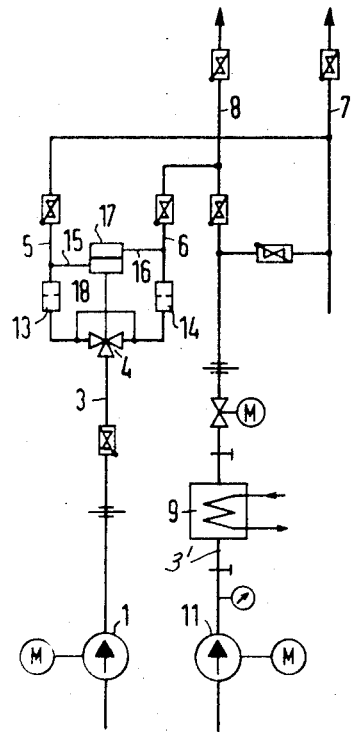
FIG. 1 is a schematic circuit diagram of a safety feed system in accordance with the invention and including a three-way valve.
Figure 2:
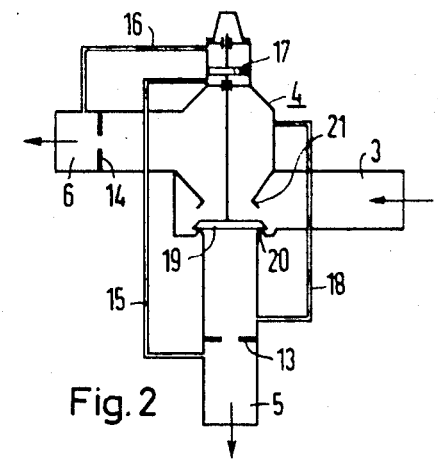
FIG. 2 is an enlarged diagrammatic longitudinal cross-sectional view of the three-way valve of FIG. 1 which is piston-controlled.

Referring now to the drawing and first, particularly to FIG. 1 thereof, there is shown only part of a feed system which includes a high-pressure pump 1 operating in the feed line 3. The feed line 3 is divided by a piston-controlled three-way valve 4 into two branch lines 5 and 6 leading to respective low-pressure feed lines 7 and 8. An after-cooler 9 and an after-cooling pump 11 are diposed in a low-pressure feed system line 3'. Immediately behind or downstream of the three-way valve 4, there is located in each branch line 5 and 6, a fixed throttle 13 and 14, respectively, which constitutes the main resistance of the system. The throttles 13 and 14 are designed so that for full pump output, a pressure loss of about 20 to 25 kp/cm² is produced. For the operation of the three-way valve 4, the following control lines, as is apparent from FIG. 2, are required: Thus, downstream of the throttle 14, a control line 16 branches off leading to the upper side of the actuator piston 17. Further, a control line 15 is provided extending from the lower side of the piston 17 to the branch line 5 downstream of the throttle 13. A pressure equalizing line 18 is connected between or bridges the spaces located above and below the valve member or disc 19.

In the initial setting, the path from the high-pressure feed pump 1 is always openly connected by the three-way valve 4 to one of the feed lines 7 or 8. In response to a feed signal, i.e. for average or minor leakages, the pump 1 is started up in the partial feed system. Switching of the three-way valve 4 becomes necessary only if the respective openly-connected feed branch line is ruptured.

The operation of the automatic three-way valve 4, which is controlled without any auxiliary medium, is apparent from FIG. 2. In the normal condition, the valve disc 19 rests, due to the action of the force of gravity, on the lower valve seat 20 of the outlet to the branch line 5, so that the branch line 6 is thereby openly connected to the feed line inlet 3. Assuming that a rupture of the branch line 6 occurs, the following events then ensue: Due to the start-up of the high pressure pump 1, a pressure of about 20 to 25 atmospheres absolute (ata) builds up upstream of the throttle 14. The counterpressure of the atmosphere in the building in which the system is housed prevails downstream of the throttle 14 and, in addition, a small pressure loss is present in the line from the throttle to the point at which the rupture has occurred. In the branch line 5, an undefined pressure, initially prevails, because this part of the pipeline is sealed on the one side by the valve member or disc 19 of the three-way valve 4 and, on the other side, by various check valve members, diagrammatically shown in FIG. 1, of the low pressure feed line 7. Through the pressure equalizing line 18, the pressure which prevails upstream of the throttle 14, is then built up in the foregoing region of the branch line 5. Under these conditions, the valve member or disc 19 is moved from the position illustrated in FIG. 2, because a high pressure is applied through the control line 15 to the lower side of the piston 17 whereas, the lower pressure which prevails downstream of the throttle 14 acts upon the upper side of the piston. Because of the equalizing line 18, virtually the same pressure prevails on the upper and lower sides of the valve member or disc 19. After the valve disc 19 has been displaced completely upwardly and abuts the upper valve seat 21, the ruptured branch line 6 is thereby shut off, so that the pump now forces the feed flow through the branch line 5 against the pressure of the primary circuit. High pressure is maintained on the lower side of the piston and also on the lower side of the valve disc 19, as viewed in FIG. 2. In the entire branch line 6, and also upstream of the throttle 14, the ambient pressure of the building housing the system, then prevails. Accordingly, no opening forces of any kind act upon the piston 17 or upon the valve member or disc 19, respectively, so that the valve is maintained reliably in its position. Only through the equalizing line 18 is a minute quantity of coolant leaked.

When a rupture of the branch line 6 occurs, the high-pressure pump 1 feeds from the start against the pressure of the primary circuit or circulatory loop. The valve 4 is reliably held in open position through the control line 16, because substantially only the low ambient pressure contained in the building acts upon the lower sides of the piston 17 and the valve disc.

Figure 3:
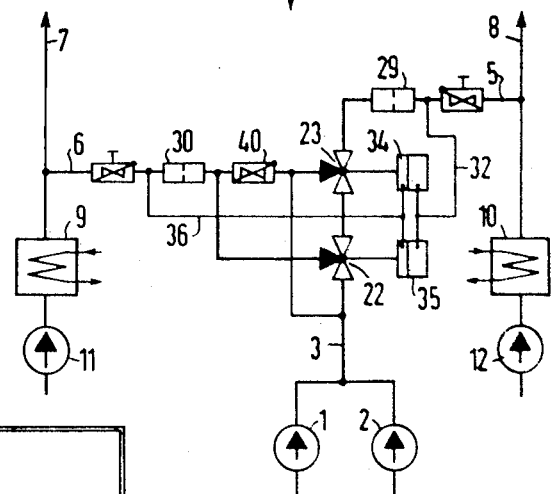
FIG. 3 is a circuit diagram of another embodiment of the safety feed system of FIG. 1 which includes a dual three-way valve.
Figure 4:
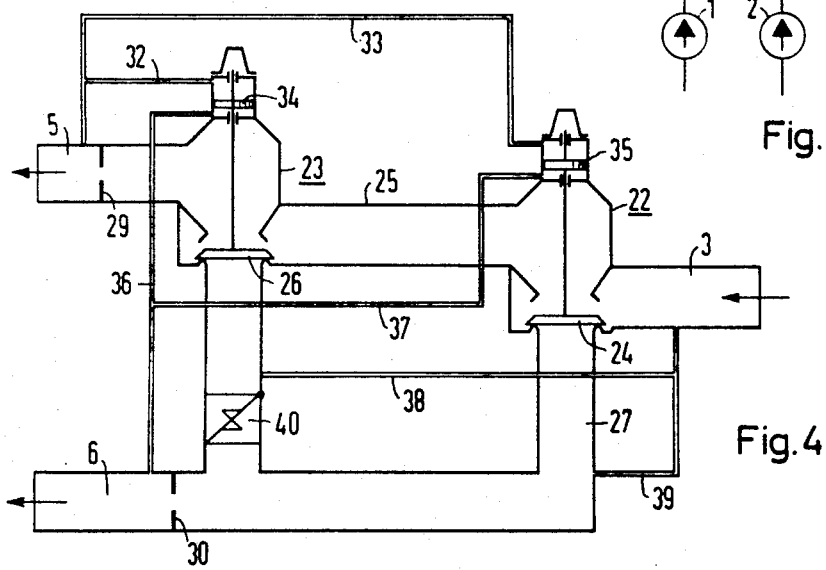
FIG. 4 is an enlarged diagrammatic longitudinal cross-sectional view of the dual three-way valve of FIG. 3.

In order to increase the reliability when a switchover occurs, it is also possible to provide the three-way valve in duplicate, as is shown in detail in FIGS. 3 and 4. Therein, the feed line 3 first leads to the inlet of the first three-way valve 22 wherein, similarly to the three-way valve 4 shown in FIG. 2, the substantially juxtaposed outlet 25 is openly connected thereto due to the fact that the valve member or disc 24, is adjusted by gravity force into a position wherein it closes the outlet 27. The outlet 25 connects with the inlet of the second three-way valve 23, which, in turn, is similarly connected openly to the substantially juxtaposed outlet leading to the main branch line 5 due to the position of the valve disc 26, as shown in FIG. 4. The two outlets 27 and 28, respectively, of the three-way valves 22 and 23, that are initially closed by the respective valve members 24 and 26, are connected in parallel to the branch line 6.

In order to control the two valves, a throttling diaphragm 29 is built into the branch line 5, and a similar diaphragm 30 into the branch line 6. Downstream of the diaphragm 29, a respective control line 32 and 33 each leads to the upper sides of the pistons 34 and 35 for the valve members or discs 26 and 24, respectively. A control line 36 and 37, respectively, which branches from the branch line 6 downstream of the throttle 30, leads to the lower side of the pistons 34 and 35. Respective pressure equalization lines 38 and 39 connect the inlet 3 of the first valve 22 with the outlets 28 and 27. In the event of rupture of the branch line 5, the pressure acting upon the upper side of the pistons 34 and 35 drops whereas, through the equalizing lines 39 and 38 and the control lines 36 and 37 the pressure prevailing downstream of the throttle 30 acts upon the lower side of the pistons 34 and 35, so that both valve discs 24 and 26 are displaced upwardly and close off the branch line 5, so that branch line 6 is now openly connected through the valves. In case of failure of one of the valves 22 and 23, however, a reliable switch-over is always still assured.

In the eventuality that the first three-way valve 22 should switch over due to rupture of the branch line 5, but the second valve 23 should remain in its center position, it is necessary that there be built into the outlet 28 of the second valve 23 a check valve 40 to prevent part of the medium detouring through the outlet 28 from still being fed back into the defective branch line 5.

Also, with the tandem connection of two three-way valves, reliable operation is assured even in the event of a major accident, since no external power is required for the operation and switching of the valves.

We claim:

1. Device for automatically switching a feed flow from one to the other of two parallel lines branching from a feed line when a break occurs in one of the branch lines, comprising a piston-controlled three-way valve situated at a location of the feed line at which the branch lines branch off, said three-way valve having an inlet connected to the feed line and a respective outlet connected to each of the branch lines, said three-way valve having a valve member normally closing one of said outlets and being operatively connected to a displaceable piston and actuable thereby for opening said normally closed outlet and closing the other of said outlets, a fixed throttle disposed in each of said outlets, a first pressure line connected between one side of said piston and the branch line connected to said normally closed outlet at a location thereof downstream of the fixed throttle in said normally closed outlet, and a second pressure line connected between the other side of said piston and the branch line connected to said other outlet at a location thereof downstream of the fixed throttle in said other outlet.

2. Device according to claim 1 wherein said piston is displaceable in substantially vertical direction, said one side of said piston being the lower side thereof, and said other side of said piston being the upper side thereof.

3. Device according to claim 2 including a pressure-equalizing line connecting space located above said valve member with space located below said valve member.

4. Device according to claim 1 wherein two of said piston-controlled three-way valves are mutually connected in tandem in the feed flow direction so that the inlet of the farther downstream valve is connected to one of the outlets of the farther upstream valve, the feed flow path passing through both said valves in series into the one branch line and the two other outlets, respectively, of said valves being connected in parallel with the other branch line, when said normally closed outlets are closed.

5. Device according to claim 4 wherein the first and second pressure lines of the respective valves are connected in parallel.

6. Device according to claim 4 including a check valve disposed in said other outlet of said farther downstream three-way valve.

* * * * *